US011599790B2

(12) United States Patent
Pandey et al.

(10) Patent No.: US 11,599,790 B2
(45) Date of Patent: Mar. 7, 2023

(54) DEEP LEARNING BASED RESERVOIR MODELING

(71) Applicant: Landmark Graphics Corporation, Houston, TX (US)

(72) Inventors: Yogendra Narayan Pandey, Houston, TX (US); Keshava Prasad Rangarajan, Sugar Land, TX (US); Jeffrey Marc Yarus, Houston, TX (US); Naresh Chaudhary, Sugar Land, TX (US); Nagaraj Srinivasan, Sugar Land, TX (US); James Etienne, Abingdon (GB)

(73) Assignee: Landmark Graphics Corporation, Houston, TX (US)

( * ) Notice: Subject to any disclaimer, the term of this patent is extended or adjusted under 35 U.S.C. 154(b) by 430 days.

(21) Appl. No.: 16/614,858

(22) PCT Filed: Jul. 21, 2017

(86) PCT No.: PCT/US2017/043228
§ 371 (c)(1),
(2) Date: Nov. 19, 2019

(87) PCT Pub. No.: WO2019/017962
PCT Pub. Date: Jan. 24, 2019

(65) Prior Publication Data
US 2020/0160173 A1 May 21, 2020

(51) Int. Cl.
*G06N 3/08* (2006.01)
*G01V 99/00* (2009.01)
*G06K 9/62* (2022.01)

(52) U.S. Cl.
CPC ............. *G06N 3/08* (2013.01); *G01V 99/005* (2013.01); *G06K 9/6256* (2013.01); *G06K 9/6262* (2013.01)

(58) Field of Classification Search
CPC .......... G06N 3/08; G06N 3/0454; G06N 3/04; G01V 99/005; G01V 2210/663; G06K 9/6256; G06K 9/6262
(Continued)

(56) References Cited

U.S. PATENT DOCUMENTS 9,946,986 B1 * 4/2018 Saleri ..................... G06Q 50/02
2008/0082469 A1 4/2008 Wilkinson et al.
(Continued)

OTHER PUBLICATIONS

Chawla et al., "SMOTE: Synthetic Minority Over-Sampling Technique," *Journal of Artificial Intelligence Research*, Jun. 2002, pp. 321-357, vol. 16.
(Continued)

*Primary Examiner* — Juan A Torres
(74) *Attorney, Agent, or Firm* — DeLizio, Peacock, Lewin & Guerra

(57) ABSTRACT

Embodiments of the subject technology for deep learning based reservoir modelling provides for receiving input data comprising information associated with one or more well logs in a region of interest. The subject technology determines, based at least in part on the input data, an input feature associated with a first deep neural network (DNN) for predicting a value of a property at a location within the region of interest. Further, the subject technology trains, using the input data and based at least in part on the input feature, the first DNN. The subject technology predicts, using the first DNN, the value of the property at the location in the region of interest. The subject technology utilizes a second DNN that classifies facies based on the predicted property in the region of interest.

18 Claims, 11 Drawing Sheets

(58) Field of Classification Search
USPC .......................................................... 706/21
See application file for complete search history.

(56) References Cited

U.S. PATENT DOCUMENTS

| | | |
|---|---|---|
| 2011/0213600 A1 | 9/2011 | Strebelle |
| 2013/0041633 A1 | 2/2013 | Hoteit |
| 2013/0080066 A1 | 3/2013 | Al-Dossary et al. |
| 2014/0149041 A1 | 5/2014 | Sung et al. |
| 2015/0347898 A1 | 12/2015 | Hiu et al. |
| 2017/0364792 A1* | 12/2017 | Chai ................... G06N 3/0445 |
| 2018/0047389 A1* | 2/2018 | Song ................... G10L 15/142 |
| 2019/0383965 A1* | 12/2019 | Salman ................ G01V 1/30 |

OTHER PUBLICATIONS

International Search Report and The Written Opinion of the International Search Authority, or the Declaration, dated Dec. 26, 2017, PCT/US2017/043228, 15 pages, ISA/KR.

Isaaks, E. H. and Srivastava, R. M. An Introduction to Applied Geostatistics, Oxford Univ. Press, New York (1989), pp. 40-56 and 140-183.

Korjani et al., "Reservoir Characterization Using Fuzzy Kriging and Deep Learning Neural Networks," *Presented at the SPE Annual Technical Conference and Exhibition*, Sep. 26-28, 2016, Dubai, UAE.

LeCun et al., "Deep Learning," *Nature*, May 28, 2015, pp. 436-444, vol. 521.

Srivastava et al., "Dropout: A Simple Way to Prevent Neural Networks from Overfitting," *Journal of Machine Learning Research*, Jun. 2014, pp. 1929-1958, vol. 15, Issue No. 1.

* cited by examiner

DEEP LEARNING BASED RESERVOIR MODELING

PRIORITY

The present application is a U.S. National Stage patent application of International Patent Application No. PCT/US2017/043228, filed on Jul. 21, 2017, the benefit of which is claimed and the disclosure of which is incorporated herein by reference in its entirety.

TECHNICAL FIELD

The present description generally relates to reservoir modeling including deep learning based three dimensional ("3D") reservoir modeling.

BACKGROUND

Geological models may be used to represent subsurface volumes of the earth. In some geological modeling systems, a subsurface volume may be divided into a grid consisting of cells or blocks and geological properties may be defined or predicted for the cells or blocks.

Figure 1:
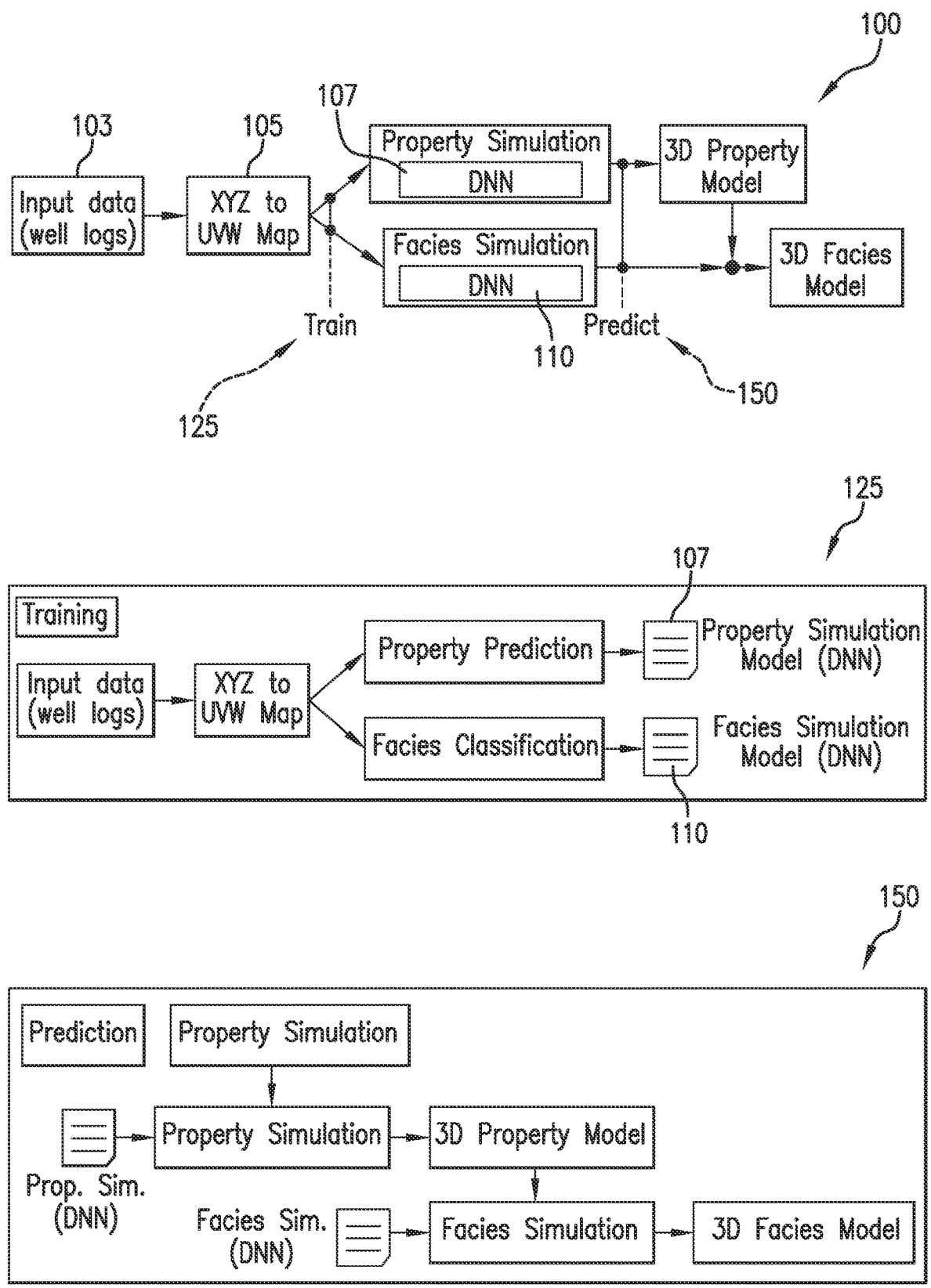
FIG. 1 illustrates a block diagram of an example deep learning process for developing full-scale 3D static reservoir models, and a training process and a prediction process in accordance with some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Modeling of geologic volumes is used in different industries and fields of technology. One purpose of such modeling is to organize existing information on a geologic volume and to predict the nature and distribution of descriptive attributes and/or quantitative values within the geologic volume, thereby facilitating studies and actions relative to the volumes. Modeling may be performed in several ways, as for example, by making maps or sections of volumes directly from the information. A map can refer to a two-dimensional projection on a horizontal planar surface of a representation of features of a volume. A section can refer to a graphic representation of the volume projected on a vertical plane cutting the volume. Modeling a geologic volume may be based on assembling known or conceptual data, extrapolated data, and interpolated data throughout the modeled volume. Once the model is built, displays such as maps, cross-sections, and statistical information can be derived from the model.

Modeling the earth's crust, including map and section making, involves complex geological and geophysical relationships and many types of data and observations. Of particular interest are geological volumes of sedimentary rocks or deposits, since oil and gas, mineral deposits, and ground water normally occur in sedimentary deposits, which are typically in porous reservoirs such as clastic (e.g., sandstones), secreted, and/or precipitated deposits. Such deposits generally exist in layers (e.g., strata, beds), formed over periods of geological time by various physical, chemical, and biological processes. The deposits may have been formed by rivers dropping sediments within their channels or at their deltas, by windblown sediment, by wave and marine action, by tidal action, by precipitation from a solution, by secretions by living organisms, or by other mechanisms. The deposits may have been modified by weathering, erosion, diagenesis, burial, and/or structural movement.

A present day layer or formation of sedimentary rocks or deposits was originally laid down on a depositional surface (e.g., time line) that was either essentially horizontal or at an angle or slope (e.g., depositional slope) with respect to a horizontal plane (e.g., sea level). The deposited layer may have experienced vast changes in position and configuration over time. Forces of burial, compaction, distortion, lateral and vertical movement, weathering, etc., may have resulted in the formation being fractured, faulted, folded, sheared, or substantially modified. As a result, a geologic volume can be a complex relationship of rock layers which may extend thousands of feet below the surface of the earth to the earth's mantle. A particular geologic volume may involve numerous superimposed layers of sediments, which were originally deposited on a horizontal or sloping depositional surface and may be subsequently tilted, fractured, folded, pierced, overturned, faulted, weathered, eroded, or otherwise modified in different ways.

Substantial efforts are made in studying any given geologic volume to obtain as much data as possible about the volume. Even though several wells may be drilled, and numerous geophysical surveys made, it may be a common practice to interpolate and extrapolate critical data throughout the volume. However, interpretation by manual interpolation and extrapolation of data is tedious, time consuming, and may be subject to errors of logic. It may also be difficult because geologic layers, strata, or beds may not lie above one another in neat, consistent, horizontal, and laterally extensive sequences. The formations vary in their lateral extent and spatial position and attitude and the interpolation and extrapolation must take this into account.

To address at least some of the above, geologic modeling may include techniques for "gridding" in three dimensions (e.g., "3D gridding"). Gridding, in an example, refers to dividing a subsurface region into cells, tessellations, or some form of mesh, within which petrophysical properties or parameters or attributes (e.g., lithology, porosity, water saturation, permeability, density, oil/water ratio, geochemical information, paleo data, etc.) are assigned to each cell. Each geologic volume of interest therefore may be modeled by a set of cells. In a three dimensional geologic volume for 3D gridding, each of the cells has a respective shape which may be a cube, regular volumetric polygon, irregular volumetric polygon, ellipsoid, irregular curved volume, pebi grid or any other three dimensional shape. However, creating such models using 3D grids may be technically challenging and laborious.

A model using a grid also may have a geometric constraint(s) in that the model could be deficient in representing the geologic volume as the arrangement of cells may be a coarse representation of the volume. In particular, the present position of layers of a geologic sequence rarely lies in a perfectly horizontal orientation. Although sedimentary layers are normally formed on a depositional surface which is essentially horizontal or on a sloping surface, this condition rarely persists after any substantial period of geologic time. Thus, a stratigraphic pattern or style within sequences may be varied and substantially different and may not be accurately modeled using the gridding approach for the geologic volume.

In comparison to the above discussion, embodiments described herein are gridless and, as a result, provide several advantages, such as avoiding the computational and hardware requirements involved in creation and storing a huge grid for geologic modeling. The subject technology uses deep neural network models of one or more distributions of points within a geologic volume, referred to as a pointcloud. The point cloud representation is capable of providing a very high resolution representation of a reservoir model, where the reservoir model may refer to a computer model of a petroleum reservoir that may be used, in some examples, for improving estimation of reserves, making decisions regarding the development of the field, predicting future production, placing additional wells, and evaluating alternative reservoir management scenarios. By the virtue of using deep learning algorithms applied in embodiments described herein, it is further possible to have a distributed architecture implementation of such embodiments to achieve highly optimized performance. The subject technology, as described further herein, formulates rock-type facies simulation as a classification problem using simulated petrophysical properties, thereby establishing a direct relationship between simulated petrophysical properties and facies.

Artificial intelligence (AI) is a technical field with practical applications and active research topics, including those that are applied to real-world problems (e.g., image or object recognition, speech recognition, robotics, automated driving, finance, etc.). A source of difficulty in some real-world artificial intelligence applications may be factors of variation that can influence each single piece of data that is observed. A computing device or machine using AI techniques therefore may have difficulty extracting high-level or abstract features from raw data. Deep learning algorithms may resolve this difficulty by breaking a desired complicated mapping into a series of simple mappings, each described by a different layer of a model.

Implementations of the subject technology describe a static reservoir modeling methodology based on deep learning algorithms. More specifically, implementations described herein receive, as input, a point cloud with spatial properties, which are used to provide a prediction of properties, and classify data points into buckets that represent respective facies. A point cloud as referred to herein may be a set of data points in a coordinate system, such as X, Y, and Z coordinates in a three-dimensional coordinate system, or a set of data points in any other coordinate system. A point cloud for a geologic model may correspond to a geologic volume. Point cloud data may refer to data organized such that one or more spatial coordinates (e.g., locations) of each point in a point cloud are included with other data related to that point. In the case of geological modeling, each point cloud may include point cloud data for one or more petrophysical properties or other attributes for a given geologic volume such as geomechanical or geochemical data.

As described by embodiments herein, point cloud data, derived from one or more well logs, may be utilized for developing 3D static reservoir models. In an example, such 3D static reservoir models may be used to provide a static description of the reservoir prior to production. Processes for developing a full-scale 3D static reservoir model are shown in a block diagram in FIG. 1 described further below.

Embodiments described further herein use a trained deep neural network for predicting a petrophysical property (e.g., porosity, lithology, water saturation, permeability, density, oil/water ratio, geochemical information, paleo data, etc.) at points in a point cloud, and use the predicted petrophysical property as input in a second trained deep neural network for predicting facies at the points in the point cloud. The following description covers example stages from preprocessing input data from well logs, training the aforementioned deep neural networks, and using the aforementioned deep neural networks for respectively predicting the petrophysical property and facies. Although for purposes of explanation, predicting a petrophysical property is described herein, it is appreciated that the subject technology may predict any appropriate volume mappable property (e.g., geochemical properties, geomechanical properties, etc.).

FIG. 1 illustrates a block diagram of an example deep learning process 100 for developing full-scale 3D static reservoir models, a training process 125 and a prediction process 150. Not all of the depicted processes may be required, however, and one or more implementations may include additional processes not shown in the figure. Variations in the arrangement and type of the processes may be made without departing from the spirit or scope of the claims as set forth herein.

Oil well "logging" can refer to the collection of information relating to properties of the earth formations traversed by a wellbore for petroleum drilling and production operations. For example, in oil well wireline logging, a probe or "sonde" is lowered into the borehole after some or all of the well has been drilled, and is used to determine certain properties of the formations traversed by the borehole. In an example, various properties of the earth's formations are measured and correlated with the position of the sonde in the borehole, as the sonde is pulled uphole. These properties may be stored in one or more well logs.

In an embodiment as illustrated, the deep learning process 100 uses well logs as input data 103. In an example, the well logs provide one or more petrophysical properties, facies, and other related attributes along the trajectory of the wells. These properties available in the well logs are used for training a deep neural network (DNN) 110, such as a deep feedforward network, for predicting the petrophysical properties at the random locations in a region of interest away from the location of wells.

In an embodiment, the DNN 110 used for facies prediction is a deep neural network classifier that uses the properties available in the well logs to train a classifier for predicting the facies based on available petrophysical property values, such as porosity, permeability, etc., at a given location in the region of interest. As used herein, a facies may refer to a body of rock with specified characteristics. Further details for developing the 3D static reservoir model using deep learning algorithms are described in FIG. 2 below.

Initially, input data 103 is read from one or more well logs. A well log may include data corresponding to at least one petrophysical property (e.g., porosity, lithology, water saturation, permeability, density, oil/water ratio, geochemical information, paleo data, etc.) along the trajectory of a given well used for oil well drilling. In another example, the input data 103 may also include other advanced input features and/or conceptual data (e.g., provided by a geoscientist based on prior knowledge and experience) as described further below.

The data from the well logs then undergoes preprocessing using one or more techniques. In an example, a UVW coordinate mapping 105 of XYZ (e.g., Cartesian) coordinates is performed to remove the discontinuities in the data in horizontal directions arising from faults, or significant dips, and folds present in the present day structural space. Further details of UVW coordinate mapping and other preprocessing techniques are discussed in the description of FIG. 2 below.

During a training process 125, a DNN 107 (e.g., a deep feedforward network) for modeling a petrophysical property and the DNN 110 for facies modeling are then trained. Further details of training the DNN 107 for petrophysical property modeling and the DNN 110 for facies modeling are discussed in further detail in FIG. 2 below.

After the DNNs are trained and tested for petrophysical property prediction and facies classification, during a prediction process 150, a predefined number of random points are generated in the 3D region of interest encompassing the well logs (e.g., referred to as "random point cloud" hereinafter). A trained DNN 107 for petrophysical property prediction is used for predicting a petrophysical property at each point in the random point cloud. After the predicted petrophysical properties are available, the DNN 110 is used for predicting the facies at each point in the random point cloud based on the predicted petrophysical property at each point. Further discussion of petrophysical property prediction and facies prediction utilizing the predicted petrophysical property are described in FIG. 2 below.

The following discussion describes, in further detail, example flowcharts for a process performing petrophysical property prediction and facies classification, and displaying a 3D reservoir model. Embodiments described further herein use a trained deep neural network for predicting a petrophysical property (e.g., porosity, lithology, water saturation, permeability, density, oil/water ratio, geochemical information, paleo data, etc.) at points in a point cloud, and use the predicted petrophysical property as input in a second trained deep neural network for predicting facies at the points in the point cloud. In particular, the following description covers steps from preprocessing input data from well logs, training the aforementioned deep neural networks, and using the aforementioned deep neural networks for respectively predicting the petrophysical property and facies at points in a point cloud.

Figure 2A:
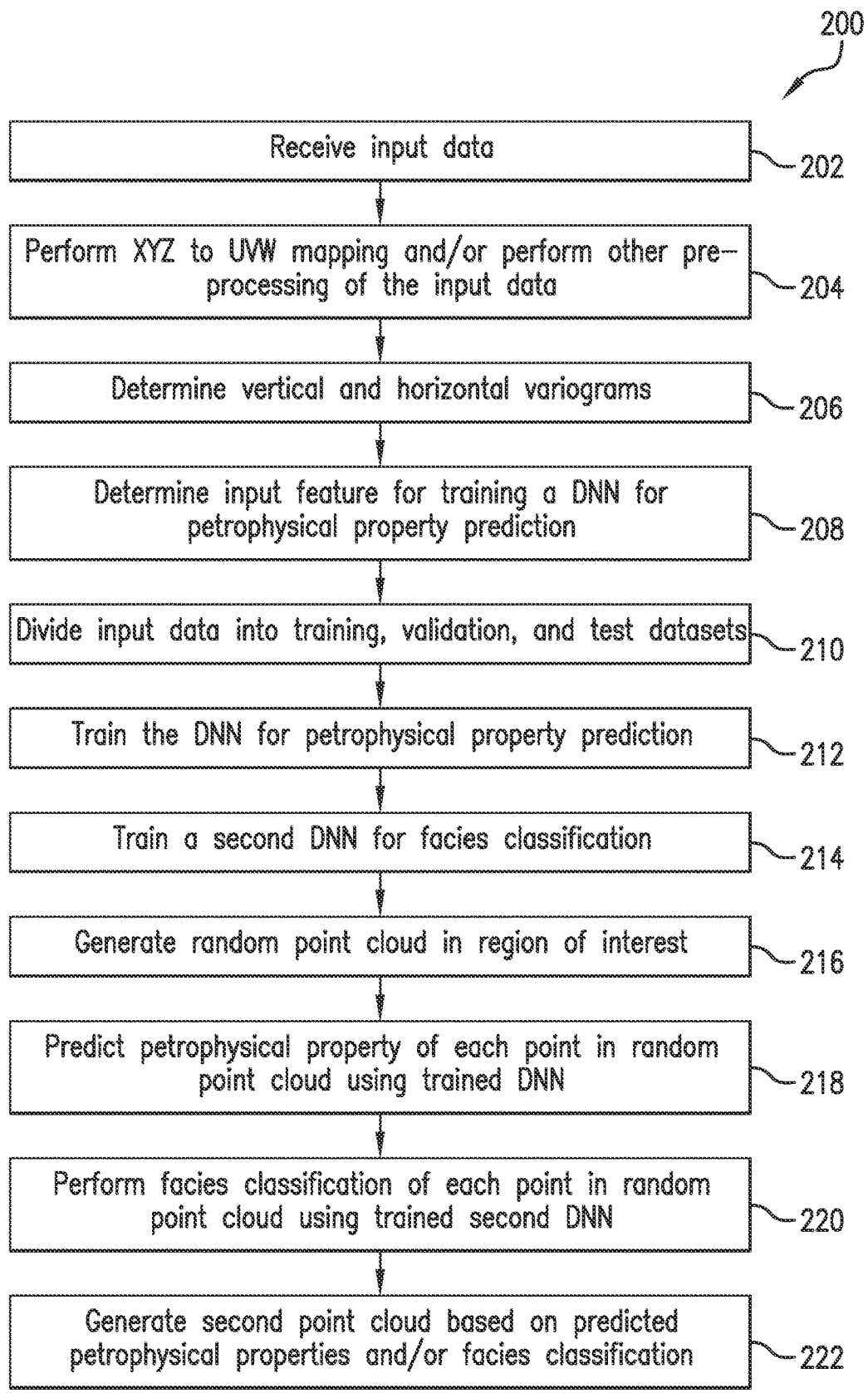
FIG. 2A illustrates a flowchart of an example process for petrophysical property prediction and facies classification in accordance with some embodiments.

FIG. 2A conceptually illustrates a flowchart of an example process 200 for petrophysical property prediction and facies classification. Although this figure, as well as other process illustrations contained in this disclosure may depict functional steps in a particular sequence, the processes are not necessarily limited to the particular order or steps illustrated. The various steps portrayed in this or other figures can be changed, rearranged, performed in parallel or adapted in various ways. Furthermore, it is to be understood that certain steps or sequences of steps can be added to or omitted from the process, without departing from the scope of the various embodiments. The process 200 may be implemented by one or more computing devices or systems in some embodiments.

At block 202, input data is received. In an example, the input data includes information associated with one or more well logs in a region of interest, and the region of interest corresponds to a geologic volume. Information included in the input data may include Cartesian coordinates (e.g., XYZ coordinates) corresponding to locations in the region of interest. In an example, the well logs provide one or more petrophysical properties, facies, and other related attributes along the trajectory of the wells. These properties available in the well logs are used for training a deep neural network for predicting the petrophysical properties at the random locations in a region of interest away from the location of wells. In another example, the input data 103 may also include other advanced input features and/or conceptual data (e.g., provided by a geoscientist based on prior knowledge and experience) as described further below.

The input data from the well logs then undergoes preprocessing using one or more of the following techniques.

At block 204, a mapping of Cartesian coordinates of each point to UVW coordinates and/or other preprocessing are performed on the received input data. As discussed herein, a UVW mapping is performed to provide a different representation (e.g., a "shoe-box" or "flat" space) of the original stratigraphic system. A UVW coordinate mapping of XYZ (e.g., Cartesian) coordinates is performed to remove the discontinuities in the data in horizontal directions arising from faults, or significant dips, and folds present in the present day structural space. A proxy representation of the original stratigraphic system, referred to as a "shoe-box" or "flat" space described by the UVW transform coordinates, is generated. This can be approximated by using a flattening algorithm when faults and folds are present. If the input data has nearly horizontally aligned stratigraphic layers, generating the proxy representation in UVW coordinates may not be required and the original Cartesian coordinates can be used for the model development. In case the UVW conversion is performed initially, the calculations maintain UVW representation through the processes of training and prediction, and a generated point cloud with one or more predicted properties may be mapped back to XYZ coordinates from UVW.

Facies are treated as classes and facies prediction is formulated as a classification problem in at least some embodiments described herein. In certain cases, the number of data points belonging to one or more facies may be significantly greater or smaller than the other facies causing population imbalance (e.g., an amount of limestone is much more than an amount of sandstone based on data from a well log). For training a DNN classifier for facies classification, a Synthetic Minority Over-sampling Technique (SMOTE) may be employed to balance the training sample population distribution across different facies. In a case in which one or more facies dominate the training data and other facies occur rarely, the population imbalance may adversely affect the training of DNN classifier. Therefore, as part of preprocessing in block 204, it is important to ensure population balance across facies classes using SMOTE before training the DNN facies classifier. Although SMOTE is mentioned, it is appreciated that any appropriate oversampling or undersampling technique may be used and still be within the scope of the subject technology. For example, an adaptive synthetic sampling technique (e.g., ADASYN algorithm) may be used for oversampling, or a random undersampling technique may be used to balance the distribution of classes by randomly removing a majority class sample.

In one or more implementations, during preprocessing at block 204, normalization of the input and output data may be performed such that the values for different inputs and output variable are in the acceptable range to ensure numerical stability.

At block 206, a vertical variogram and a horizontal variogram of a petrophysical property in each stratigraphic interval of the region of interest is determined. Examples of variograms are discussed in further detail with respect to FIG. 3 below. Note, in lieu of variograms, other spatial models including multiple point models, explicit vectors, and spatial models with varying azimuths may be applied.

At block 208, using at least the vertical and the horizontal variograms, an input feature is determined for providing to a first deep neural network (DNN), such as a deep feedforward network, for predicting a petrophysical property (e.g., porosity, lithology, water saturation, permeability, density, oil/water ratio, geochemical information, paleo data, etc.). In an example, for determining the input feature, the region of interest may be divided into layers using the range of a given vertical variogram. Further details of this approach are described in FIG. 4 below. Other types of (advanced) input features are also described further below.

At block 210, the received input data is divided into a training dataset, a validation dataset, and a test dataset. The training dataset, the validation dataset, and the test dataset may be mutually exclusive subsets of the received input data. In an example, the input and output dataset are randomized and split into training, validation and testing datasets. Data corresponding to a predefined number of wells are kept aside to validate and test the performance (e.g., accuracy) of trained DNNs.

Although three different data sets for training, testing, and validation data are discussed above, in at least an embodiment, for a given fixed set of input variables, different (and mutually exclusive) sampling data sets may be taken using k-fold cross-validation. In k-fold cross-validation, the original sample is randomly partitioned into k equal sized subsamples. Of the k subsamples, a single subsample is retained as the validation data for testing the model, and the remaining k−1 subsamples are used as training data. The cross-validation process is then repeated k times (e.g., the "folds"), with each of the k subsamples used exactly once as the validation data. The k results from the folds can then be averaged to produce a single estimation. An advantage of k-fold cross-validation over repeated random sub-sampling may be that all observations are used for both training and validation, and each observation is used for validation exactly once. In some examples a 10-fold cross-validation may be used, but in general k can be an unfixed parameter.

In a 10-fold cross-validation example, the input data may be divided into 10 different and mutually exclusive datasets. One of the 10 divided datasets may be selected to be the validation dataset, and the remaining nine (9) datasets are used for training.

At block 212, using the input feature, the first DNN is trained for predicting a value of the petrophysical property at an arbitrary location(s) in the region of interest. Training the first DNN uses the training, validation, and test datasets (as described further herein) to minimize the mean squared error of predicted property values and observed property values. In an example, a DNN with a predefined architecture is trained so that the prediction error on the validation data set (e.g., wells selected for validation purpose) is minimized. For training the DNN for petrophysical property modeling, a root-mean-square error (RMSE) of predicted property values and observed property values is minimized. Although RMSE is mentioned, it is appreciated that any appropriate technique for error measuring may be used, for example, mean absolute error (MAE), mean absolute percentage error (MAPE), mean absolute scaled error (MASE), mean error (ME), and mean percentage error (MPE), etc. Domain specific attributes and/or domain specific metrics may also be used. In yet another example, a cross correlation coefficient may be used in conjunction with RMSE.

At block 214, after the first DNN is trained, a second DNN, such as a deep feedforward network, is trained for classifying a type of facies at the arbitrary location(s) in the region of interest. Properties that are available in the well logs may be utilized to train the second DNN. In an example, during training, the cross-entropy based on predicted facies and observed facies is minimized.

The first DNN and the second DNN are not provided access to the testing data (e.g., remaining unseen during the training step in blocks 212 and 214). Once the training is finished with a reasonable minimization of validation error, trained DNN performance can be measured on data from the wells kept aside for testing (e.g., the test dataset mentioned above).

At block 216, a random point cloud is generated in the region of interest. The random point cloud includes multiple, randomly determined, points corresponding to different locations in the region of interest.

At block 218, for each point in the random point cloud, a value of the petrophysical property at the point is predicted using the trained first DNN. Thus, respective (predicted) values of the petrophysical property at the points corresponding to the different locations in the region of interest are provided. Although predicting a petrophysical property is described herein, it is appreciated that the subject technology may predict any appropriate volume mappable property (e.g., geochemical properties, geomechanical properties, etc.) for each point in the random point cloud.

At block 220, facies classification is performed, using the trained second DNN, on the points in the random point cloud. Respective values of the facies classification at the points corresponding to the different locations in the region of interest are provided.

At block 222, a second point cloud, representing a 3D reservoir model of the region of interest, is generated using at least the respective values of the petrophysical property and/or the facies classification. More specifically, the second point cloud includes and/or represents information corresponding to respective values of the petrophysical property and/or the facies classification for each point in the second point cloud. The second point cloud may then be used for displaying a 3D reservoir model of the region of interest. In another example, two separate point clouds may be provided. A first point cloud may be generated using the values of the petrophysical property from the random point cloud, and a second point cloud may be generated using the values of the facies classification from the random point cloud.

Figure 2B:
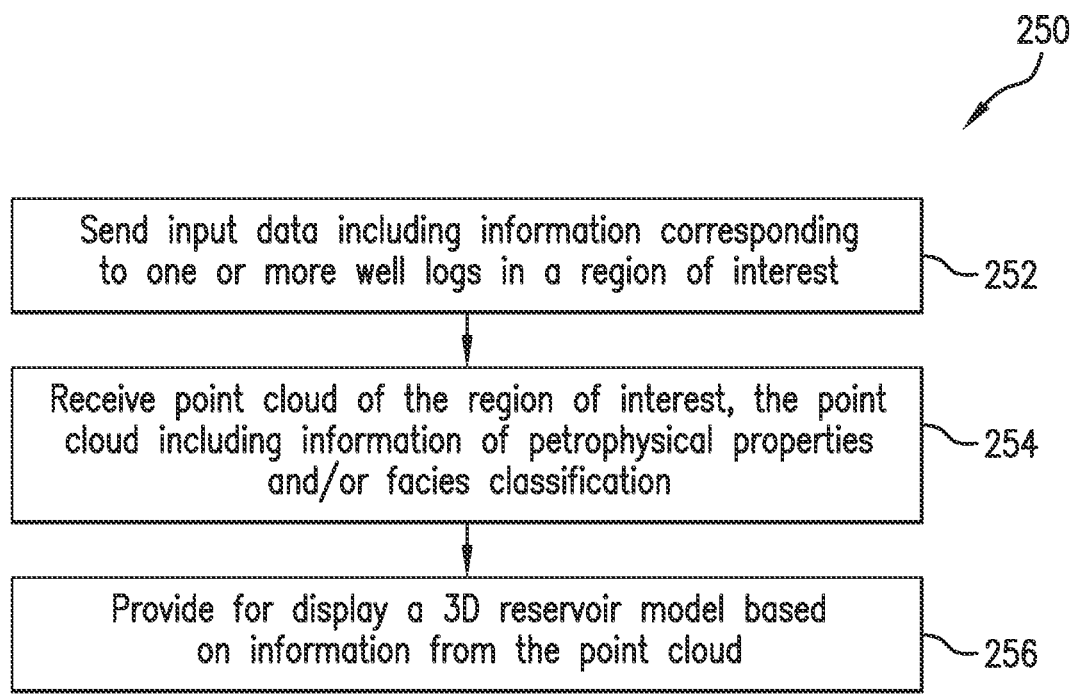
FIG. 2B illustrates a flowchart of an example process for displaying a 3D reservoir model using data from well logs in accordance with some embodiments.

FIG. 2B illustrates a flowchart of an example process 250 for displaying a 3D reservoir model using data from well logs. The process 250 may be implemented by one or more computing devices or systems in some embodiments. More specifically, the process 250 represents operations that may be performed for a client-side computing device or system for receiving and displaying a 3D reservoir model generated by the process 200 described by reference to FIG. 2A above.

At block 252, input data including information corresponding to one or more well logs in a region of interest are sent (e.g., to a server executing the instructions performing the process 200). At block 254, a point cloud is received including information corresponding to at least one petrophysical property and/or facies classification. At block 256, based on at least the information included in the point cloud, a 3D reservoir model may be provided for display. Examples of such models are discussed further below with respect to FIGS. 7 and 8.

The following discussion relates to variograms, which were discussed above in connection with FIG. 2A and used for determining, in part, an input feature for the DNN for petrophysical property prediction (which is discussed further below in FIGS. 3 and 4). In an example geostatistical approach, a semi-variogram (also referred to as a "variogram") of a property Z may be defined as the following equation (1):

$$\gamma(h) = \frac{1}{2n(h)} \sum_{n(h)} E\left[(Z(u+h) - Z(u))^2\right], \ldots$$

where n(h) is the number of pairs that are separated by the distance h (also called lag).

In view of equation (1), considering variation of property Z along one well at a time, the vertical variogram $\gamma_v(h)$ may be calculated as the following equation (2):

$$\gamma_v(h) = \frac{1}{2n(h)} \sum_{n(h)} E\left[(Z(z+h) - Z(z))^2\right], \ldots$$

where z is depth measured along the trajectory of a vertical (or horizontal) well.

Final $\gamma_v(h)$ is obtained by accumulating the histograms from the individual wells and calculating the effective variogram (e.g., for each Geologic stratigraphic interval separately). In an example, the experimental variograms calculated using equation (1) are fitted using an analytical expression such as spherical variogram model. Other variogram models could be used including nested models (integration of multiple models).

Figure 3:
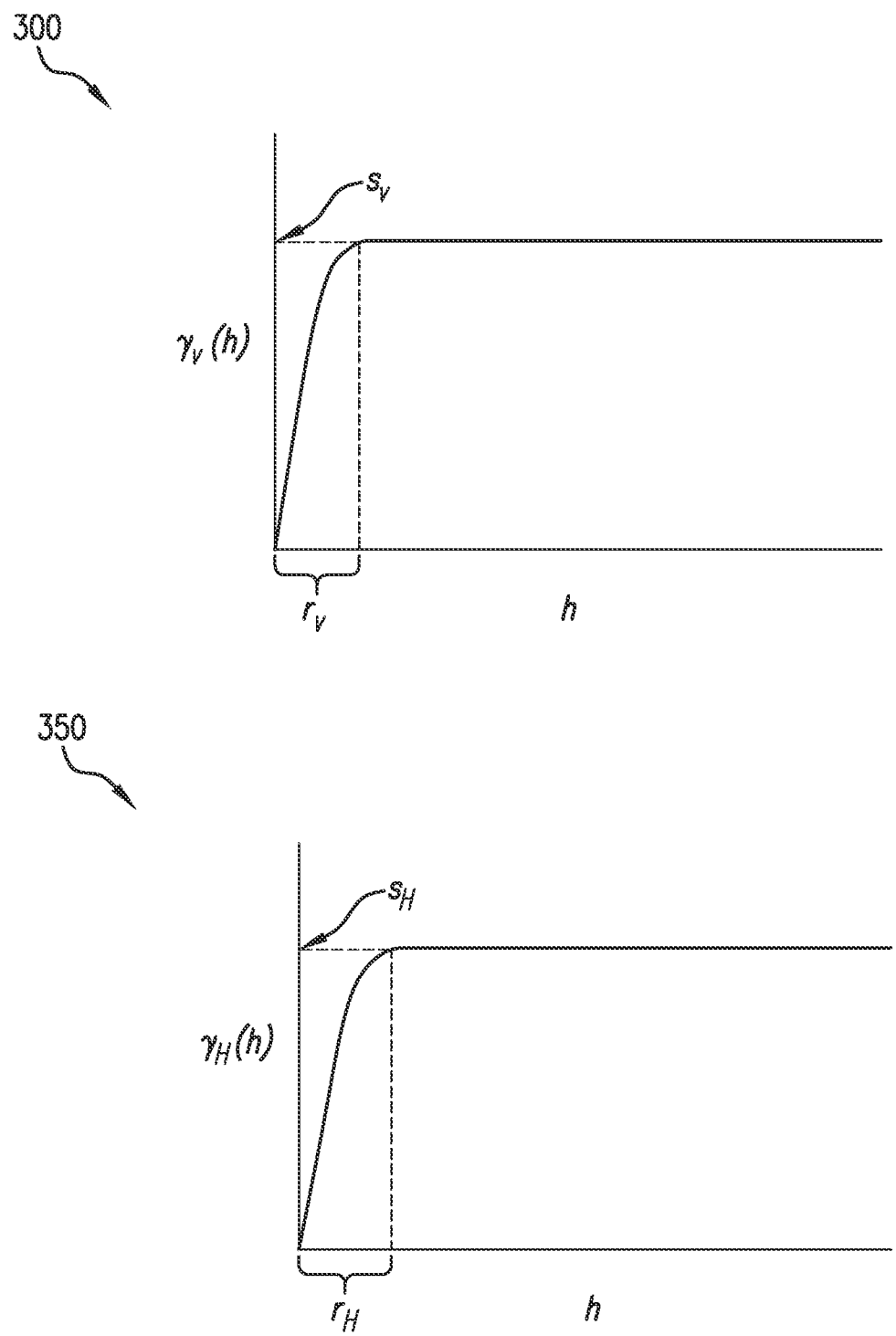
FIG. 3 illustrates schematic representations of example spherical variogram models for a vertical variogram and a horizontal variogram in accordance with some embodiments.

FIG. 3 illustrates schematic representations of example spherical variogram models for a vertical variogram 300 and a horizontal variogram 350 in accordance with some embodiments (which was previously mentioned in block 206 in FIG. 2A). In FIG. 3, $r_v$ represents the vertical variogram range. The value indicates the vertical separation from a given point over which the data are correlated; the variogram range. Beyond the correlation range, the data are uncorrelated.

Figure 4:
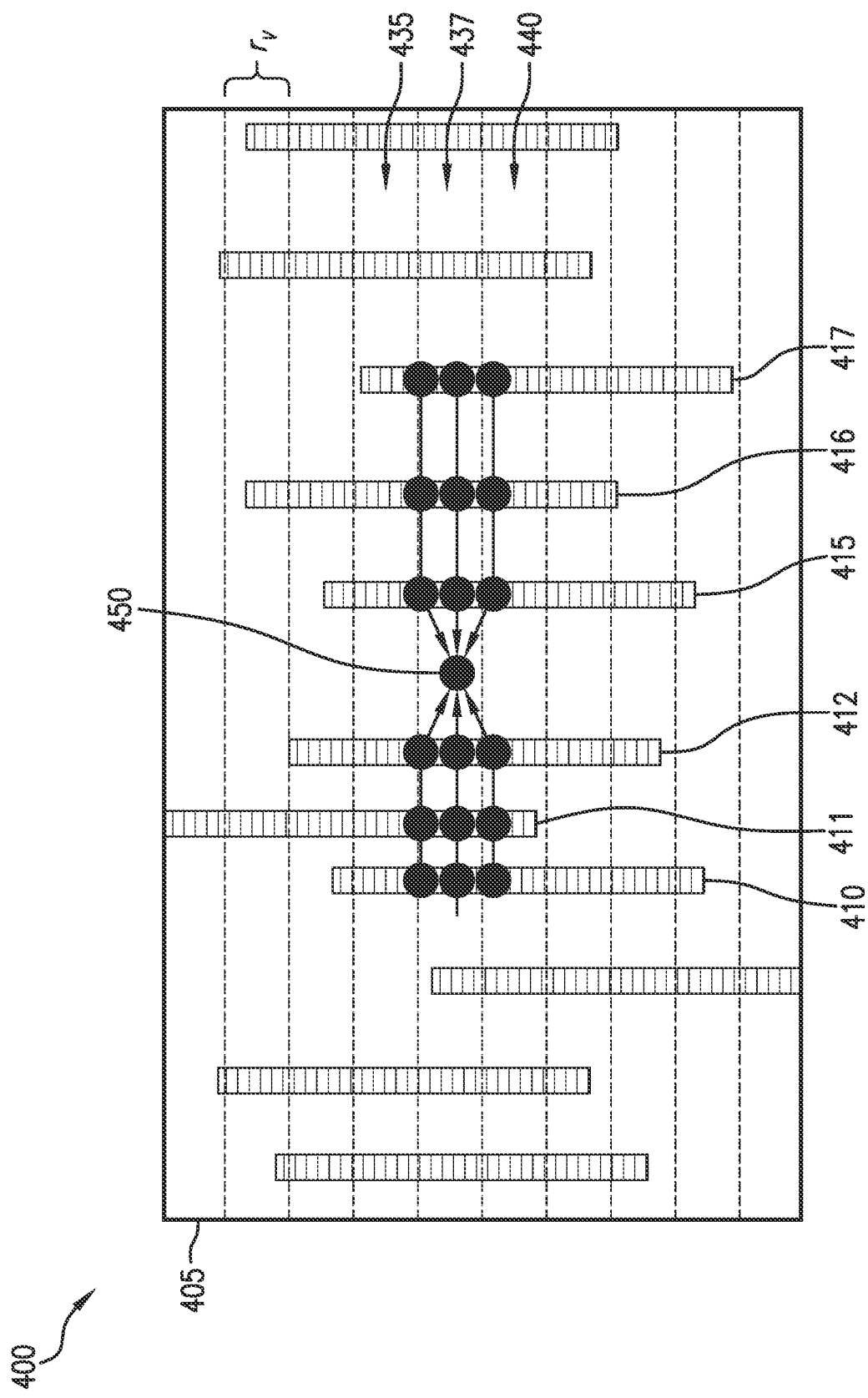
FIG. 4 is a schematic diagram that illustrates a subdivision of a region of interest into layers using the range of a vertical variogram in accordance with some embodiments.

Using the separation $r_v$, the vertical depth range of the region of interest is subdivided into vertically stacked layers (as shown in FIG. 4 discussed below). The points in each of these layers may be considered for calculating the horizontal variogram $\gamma_H(h)$ using the following equation (3):

$$\gamma_H(h) = \frac{1}{2n(h)} \sum_{n(h)} E\left[(Z(r+h) - Z(r))^2\right], \ldots$$

where r is the 2D representation of the given points in horizontal plane. Final $\gamma_H(h)$ is obtained by accumulating the histograms from the horizontal layers and calculating the effective variogram.

Similar to the vertical variogram 300, FIG. 3 illustrates a schematic representation of an example horizontal variogram 350 that leads to an estimation of $r_H$, which represents the Euclidian distance in a horizontal plane beyond which the correlations in the property values vanish.

FIG. 4 is a schematic diagram 400 that illustrates an example subdivision of a region of interest 405 into layers using the range of a vertical variogram. As previously mentioned in block 208 in FIG. 2A, this subdivision of the region of interest may be utilized to determine, in part, an input feature for the DNN for predicting a petrophysical property. As discussed before, using the separation $r_v$ corresponding to the range of the vertical variogram, the vertical depth range of the region of interest 405 is subdivided into vertically stacked layers (as illustrated by the horizontal dashed lines in FIG. 4). Vertical wells 410, 411, 412, 415, 416, and 417 are considered neighboring wells in the region of interest 405. The overlay black dots and arrows in one or more of layers 435, 437 and/or 440 illustrate the use of respective property values at the neighboring wells for property prediction at a point 450 away from the wells. After the vertical and horizontal variograms are computed and the region of interest is subdivided into stacked vertical layers, the next step is to form an input feature for petrophysical property modeling (e.g., the first DNN discussed before). The input feature for each sample point in the training dataset (e.g., a subset of the observed or input dataset) is based upon the neighboring points located at the nearest neighboring wells. In an example, the dimensions of the weight matrix for the first hidden layer are dependent on the number of features (n) in the input. Therefore, n should be fixed before starting the training in such an example. For each point on the neighboring well, the following attributes may be considered to formulate the input feature:
prop=Petrophysical property value at the neighbor point
$prop_h$=Rough property estimate based on horizontal variogram (prop+$\sqrt{2\gamma_H(d_{xy})}$)
$prop_v$=Rough property estimate based on vertical variogram (prop+$\sqrt{2\gamma_V(d_z)}$)
where,
$d_{xy}$=Euclidian distance from the neighbor point in horizontal direction
$\gamma_H(d_{xy})$=Horizontal semi-variance at the distance $d_{xy}$
$d_z$=Vertical separation from the neighbor point
$\gamma_V(d_z)$=Vertical semi-variance at separation $d_z$ Similar features may be obtained along each well along two more points shifted up and down by a depth $\varepsilon \times r_v$, where $\varepsilon$ is a small number such as $\varepsilon=0.075$. In an example, the input feature contribution from a neighboring point at well i may be denoted by the following equation (4):

$$F_i = (prop_i, prop_{h,i}, prop_{v,i}, prop_{i+\varepsilon}, prop_{h,i+\varepsilon}, prop_{v,i+\varepsilon}, prop_{i-\varepsilon}, prop_{h,i-\varepsilon}, prop_{v,i-\varepsilon}, \ldots),$$

where $(i+\varepsilon)$ and $(i-\varepsilon)$ the points achieved by shifting neighboring point i along the well trajectory by a depth $\varepsilon \times r_v$ upward and downward.

The property estimates at the points $(i+\varepsilon)$ and $(i-\varepsilon)$ are obtained by a Generalized Regression Neural Network (GRNN) interpolation. A predefined number of nearest neighbor points ($N_{nbr}$) based upon the computed distances are considered for feature formulation. In an example, each row in the basic feature matrix for an example as depicted in FIG. 4 includes $9 \times N_{nbr}$ features, and semantically represented as $R=[F_1, F_2 \ldots F_{Nnbr}]$. A randomly selected subset or batch of input feature rows formed based upon the training dataset is passed to train the DNN for petrophysical property prediction.

The feature definition depicted by equation (4) above can represent a basic set of input features that can be used for training the first DNN (which was previously mentioned in block 208 in FIG. 2A).

Additionally, as also mentioned in block 208 of FIG. 2A, the following additional advanced features may also be considered in the input feature for the petrophysical properties simulation in which other types of data (e.g., other than from well logs) are utilized as an input feature.

First, anisotropy data may be considered as an advanced feature. In this instance, the horizontal variogram calculated by equation (3) does not account for the anisotropy. Anisotropic variogram models, for example, are useful in capturing the direction dependent spatial variations in the petrophysical properties. An anisotropic variogram model provides information about the spatial variability along its major axis and minor axis of variation. If an anisotropic variogram model is available, the feature $prop_h$ is divided in to two components $prop_{h,major}$ and $prop_{h,minor}$ representing rough property estimates along major and minor axis of variation respectively.

Further, spatial continuity and trend model data may be considered as an advanced feature. Spatial continuity and background trend models are also considered as input features.

In addition, geomechanical stratigraphy data may be considered as an advanced feature. The information obtained about the geomechanical stratigraphy model based on the stress-field is also considered as a part of the input feature.

Geochemical stratigraphy (Chemostratigraphy) data may be considered as an advanced feature. Geochemical stratigraphy, which provides detailed stratigraphy based on rock geochemistry, is also considered as a part of input feature.

Seismic Stratigraphy data may be considered as an advanced feature. In this example, a 3D model developed based on seismic data is also considered as a part of input feature.

Chronostratigraphy data may be considered as an advanced feature. In this example, a chronostratigraphic model is also considered as part of input feature.

Gross depositional environment maps may be considered as an advanced feature. In this example, interpreted maps of lithology and environment of deposition are also considered as part of input feature.

Sequence stratigraphy data may be considered as an advanced feature. In this example, a 3D model developed based on interpreted outcrop, well, seismic and other geological data is also considered as part of input feature.

Geodynamic and tectonic data may be considered as an advanced feature. In this example, geodynamic and tectonic information which provides information on the deformation and kinematic history of the subsurface is also considered as part of input feature.

Paleoclimate data and derived chance of occurrence maps may be considered as an advanced feature. In this example, data derived from numerical simulations of atmospheric, oceanic and tidal conditions in the geological past, and derived maps determining the chance of occurrence of petroleum systems elements is also considered as a part of input feature.

It is appreciated that other types of advanced features may be utilized as input features in addition to those discussed above. For example, conceptual data may be provided by a geoscientist based on prior knowledge and experience. In one example, a sequence stratigraphic model of a region of interest may be utilized and a geoscientist can provide an additional input feature(s) based on prior knowledge where a particular type of rock may be without having to use seismic data. The geoscientist therefore may have knowledge of the trends regarding how a petrophysical property may change through different locations of layers of rock in the region of interest.

As discussed herein, a deep neural network such as a deep feedforward network, can be implemented to approximate a function f. Models in this regard are referred to as feedforward because information flows through the function being evaluated from an input x, through one or more intermediate computations used to define f, and finally to an output y. Deep neural networks (DNN) are called networks because they may be represented by connecting together different functions. A model of the DNN may be represented as a graph representing how the functions are connected together from an input layer, through one or more hidden layers, and finally to an output layer, and each layer may have one or more nodes.

Further, although a deep neural network such as a deep feedforward network is discussed in examples herein, it is appreciated that other types of neural networks may be utilized by the subject technology. For example, a convolutional neural network, regulatory feedback network, radial basis function network, recurrent neural network, modular neural network, instantaneously trained neural network, spiking neural network, regulatory feedback network, dynamic neural network, neuro-fuzzy network, compositional pattern-producing network, memory network, and/or any other appropriate type of neural network may be utilized.

Figure 5:
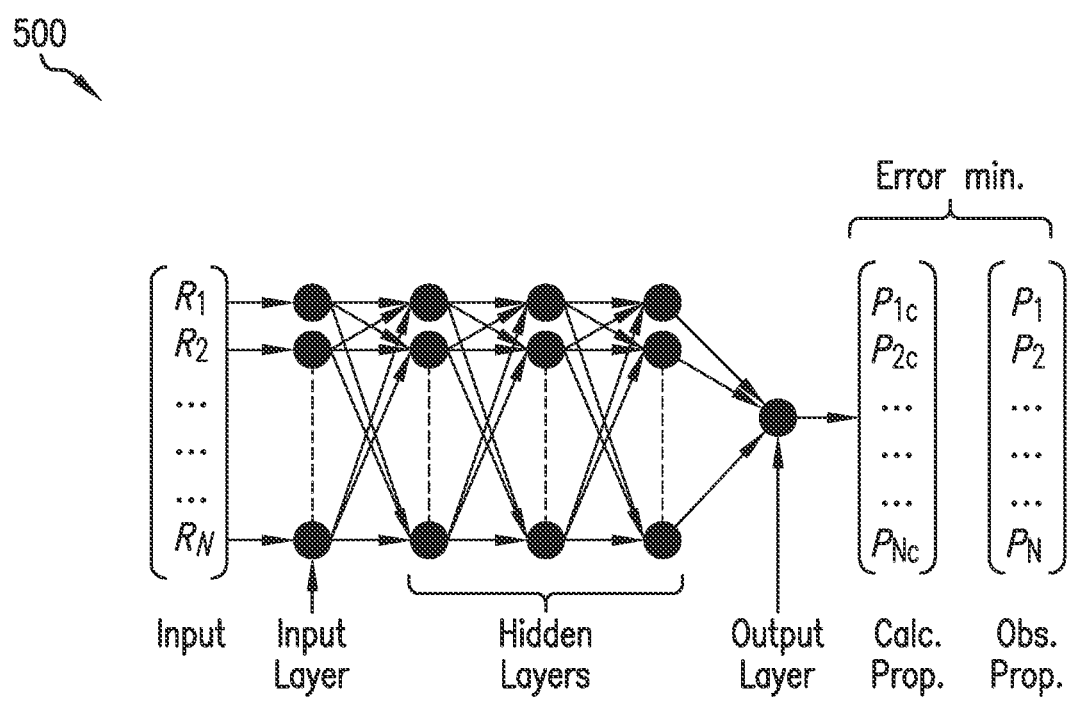
FIG. 5 illustrates a schematic diagram of an example architecture of a deep neural network (DNN) used for petrophysical property prediction in accordance with some embodiments. In one or more implementations, the DNN may be a deep feedforward network (also often called a feedforward neural network or a multilayer perceptron) regressor.

FIG. 5 illustrates a schematic diagram of an example architecture of a deep neural network (DNN) 500, such as a deep feedforward network, used for petrophysical property prediction (which was previously mentioned as the first DNN in FIG. 2A). Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The input feature, formed as discussed above, is passed to an input layer. The input layer passes the input values to the stacked fully-connected $N_{hidden}$ hidden layers, each of which has $N_{nodes}$ number of nodes. It is appreciated that all hidden layers may have same number of nodes, or the number of nodes may vary from one hidden layer to another hidden layer. In an example, the nodes in the hidden layers use a hyperbolic tangent activation function to perform nonlinear transformations on the weighed sum of the values passed from the previous layer. An activation function may be used at a hidden layer to compute outputs values for the values passed from the previous layer.

Although the example above uses the hyperbolic tangent activation function (tan h), other activation functions may be used and still be within the scope of the subject technology. For example, another geo sciences specific activation function(s) may also be used in place of the tan h function. Further, a custom activation function may be used. A domain specific activation function may also be used. Further, an activation function using unit step (e.g., threshold), sigmoid, piecewise linear, and/or Gaussian techniques may be used. Although for the purpose of illustration several hidden layers are shown in FIG. 5, it is understood that the number of hidden layers supported by the architecture of the DNN 500 may include any appropriate number of hidden layers.

Following the hidden layers in FIG. 5, a linear output layer with one node sums the activations from the last hidden layer to provide an estimated property value at the 3D point represented by the feature row. The training step optimizes the weights and biases in the hidden and output layer such that the estimation error between the estimated property values and observed property values from the well log(s) may be minimized. Estimation error may be RMSE, or a composite of RMSE and cross-correlation, or some other geosciences specific error metric.

To avoid overfitting during training, regularization of the estimation error is performed based upon the $L_2$-norms of weights in the hidden layers are added to the RMSE. An optimization process then applies a stochastic gradient descent algorithm (or any other appropriate optimization algorithm), which may use one or more iterative optimization techniques and/or use a small subset of the training dataset or batch with $N_{batch}$ training samples randomly selected at a time. The variances calculated based upon the horizontal and vertical semi-variograms are included in the input feature. The optimization process can optimize the weights and biases associated with the vertical and horizontal semi-variances, and other input features such that an error in the property estimates relative to the observed property values may be minimized. The process of training described here not only can minimize the error in property estimates, but also can incorporate spatial variance of the properties as described by the equations (2) and (3) mentioned above.

The overall training process also includes optimization of hyperparameters. These hyperparameters include machine-learning algorithm specific hyperparameters, e.g., learning rate ($\alpha$) and possible parameters for learning rate decay, batch size (m), regularization parameters ($\lambda$), $N_{hidden}$, $N_{nodes}$ etc., and geoscience specific hyperparameters, e.g. $N_{nbr}$, $\varepsilon$ etc. An example of the set of hyperparameters is $\alpha$=0.000125, m=352, $\lambda$=0.0000525, $N_{hidden}$=5, $N_{nodes}$={108, 72, 48, 32, 21}, $N_{nbr}$=8 (i.e. 72 input features), $\varepsilon$=0.075.

Following the completion of training that may be determined by the estimation error on the validation dataset falling below a cut-off value, the testing dataset is used to determine the performance of the trained DNN on unseen well logs (e.g., not used for training). The trained DNN provides the ability of predicting the petrophysical property values at random 3D points in the region of interest based on the nearest neighbor points.

Figure 6:
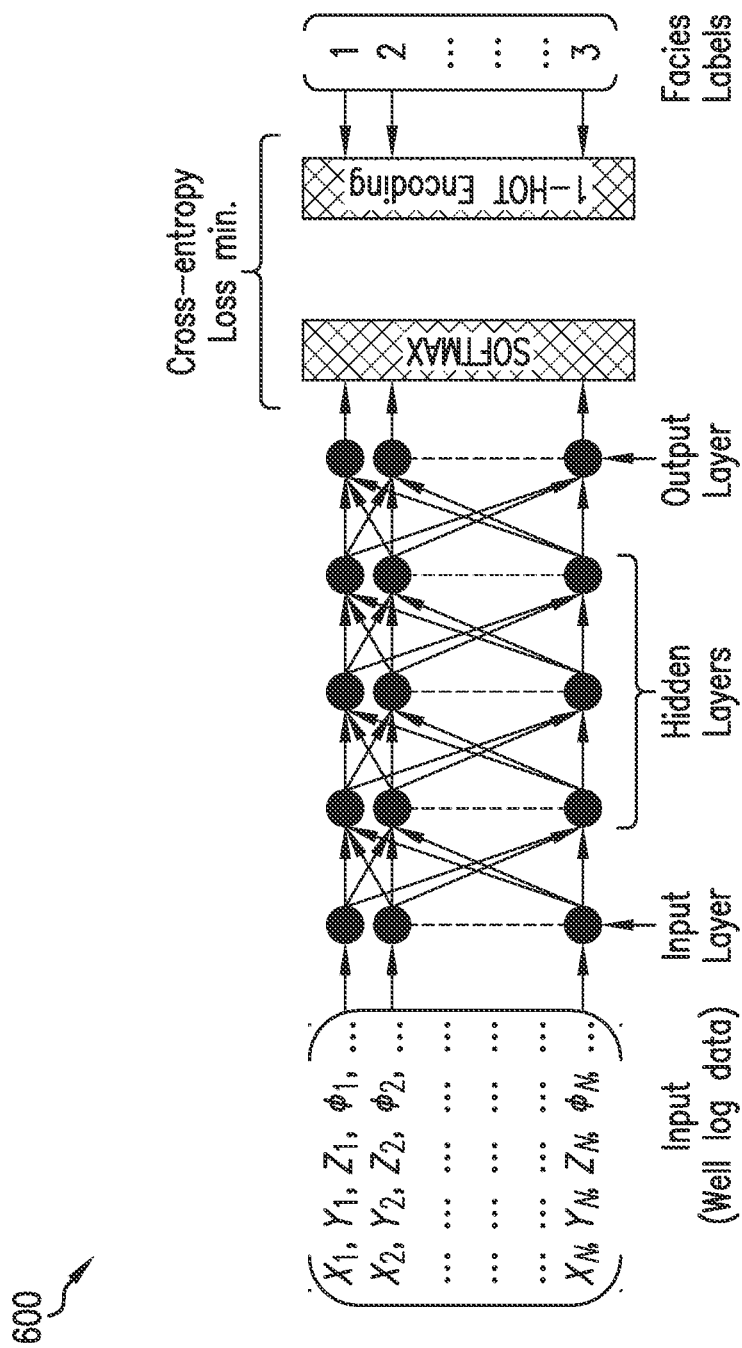
FIG. 6 illustrates a schematic diagram of an example architecture of a DNN used for facies classification in accordance with some embodiments. In one or more implementations, the DNN may be a deep feedforward network (also often called a feedforward neural network or a multilayer perceptron) classifier.

FIG. 6 illustrates a schematic diagram of an example architecture of a DNN 600, such as a deep feedforward network, used for facies classification (which was previously mentioned as the second DNN in FIG. 2A). Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In at least an embodiment, petrophysical properties (e.g., porosity, lithology, water saturation, permeability, density, oil/water ratio, geochemical information, paleo data, etc.) closely related with the facies type are used for classifying a given point in a well log (or at a random location) as corresponding to a particular type of facies. Such petrophysical properties may be referred to as facies-guiding properties. The input feature for the facies classification may include Cartesian coordinates (x, y, z) of a point and the facies-guiding properties at that point.

In an example, the DNN 600 has an input layer and stacked-hidden layers with a nonlinear activation function (e.g., Rectified Linear Unit or "ReLU"), followed by a linear output layer. The number of nodes in the output layer for facies classification is equal to the number of facies classes in an example. The values obtained from the hidden layer nodes with the ReLU activation function are subject to dropout with a probability 0.5 to avoid overfitting. Additionally, regularization of the hidden layer weights is performed to avoid overfitting. The transformed values obtained from the output layer, also called logits, are passed to a softmax function (e.g., normalized exponential function). For a dataset containing K facies with output values from the output layer denoted by $l=(l_1, l_2, \ldots, l_K)$, the softmax function may be defined as the following equation (5):

$$\sigma(l_j) = \frac{e^{l_j}}{\sum_{k=1}^{K} e^{l_k}} \, \forall \, j \in [1, K] \ldots$$

In an embodiment, the softmax function provides a probability that a given sample point belongs to a particular facies. The observed facies values are converted to one-hot encoded values following a "winner-take-all" principle (e.g., where nodes in a layer compete with each other for activation, and only the node with the highest activation stays active while all other nodes are shut down). The facies labels in the one-hot encoded format contain binary indicators, which are 1 for indicating specific facies presence at a location and 0 otherwise. As referred to herein, one-hot encoding can refer to a group of bits among which the valid combinations of values are only those with a single high (1) bit and all the others low (0). As an example, for a dataset containing 3 facies, the one-hot encoded values for the 3 facies may be facies 1≡(1, 0, 0), facies 2≡(0, 1, 0), and facies 3≡(0, 0, 1). As an example, the output softmax probabilities may then be evaluated against the one-hot encoded values of the facies labels at the sample point to calculate cross-entropy loss C given by the following equation (6):

$$C = -\frac{1}{m}\sum_{m}\sum_{j=1}^{K}[L_j \ln(y_j) + (1 - L_j)\ln(1 - y_j)], \ldots$$

where K is the number of facies in the input data, and L are one-hot encoded values for the observed facies and y represents the probability of output belonging to a particular facies computed using the softmax function.

Regularization of the calculated cross-entropy loss may be performed by adding $L_2$-norms of weights in the hidden layers to the cross-entropy loss C. The machine learning related hyperparameters remain similar to those defined in the previous section for petrophysical property modeling described above by reference to FIG. 5. An example of the set of hyperparameters is α=0.0002 (with exponential decay based upon decay rate of 0.86 applied every 1000 training iterations), m=256, λ=0.05, $N_{hidden}$=3, $N_{nodes}$={1024, 512, 256}. A sufficiently trained DNN classifier minimizes the cross-entropy loss C and therefore is subsequently used for predicting facies at any random 3D point in the region of interest using pre-computed facies-guiding properties at that random 3D point.

Figure 7:
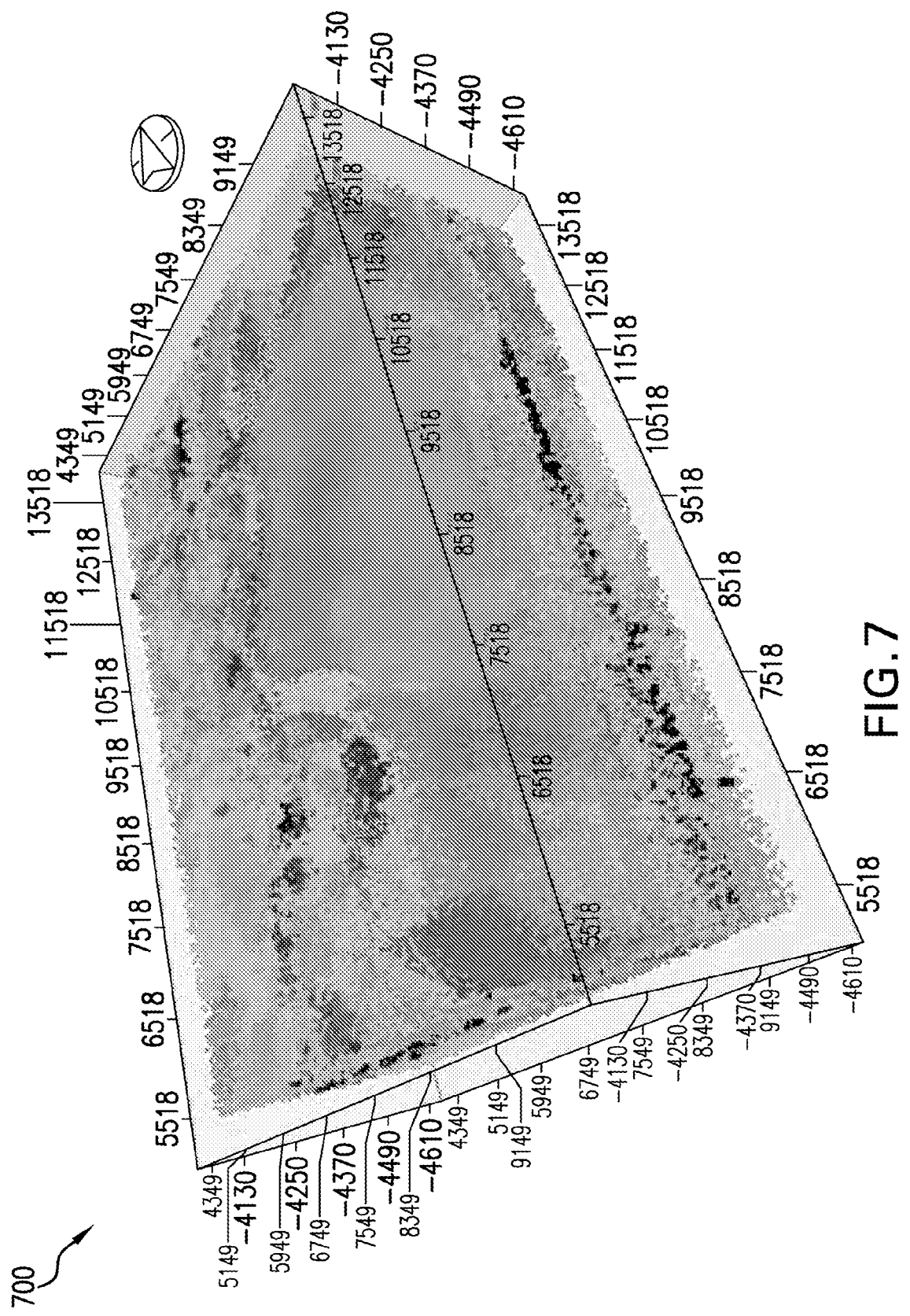
FIG. 7 illustrates a perspective view of an example point cloud representation of an output of a model for a petrophysical property (e.g., porosity) in accordance with some embodiments.

FIG. 7 illustrates a perspective view of an example point cloud representation 700 of an output of a model for a petrophysical property (e.g., porosity) (e.g., corresponding to the first DNN in FIG. 2A) in accordance with some embodiments. As illustrated, the example point cloud representation 700 is a graphical representation of a point-cloud with 500,000 points. The different colors in FIG. 7 correspond to different respective values for the petrophysical property. It is appreciated that the number of points in the point cloud is for purposes of illustration only, and developing a model with a significantly larger number of points may be possible in a distributed memory architecture implementation of the subject technology.

Figure 8:
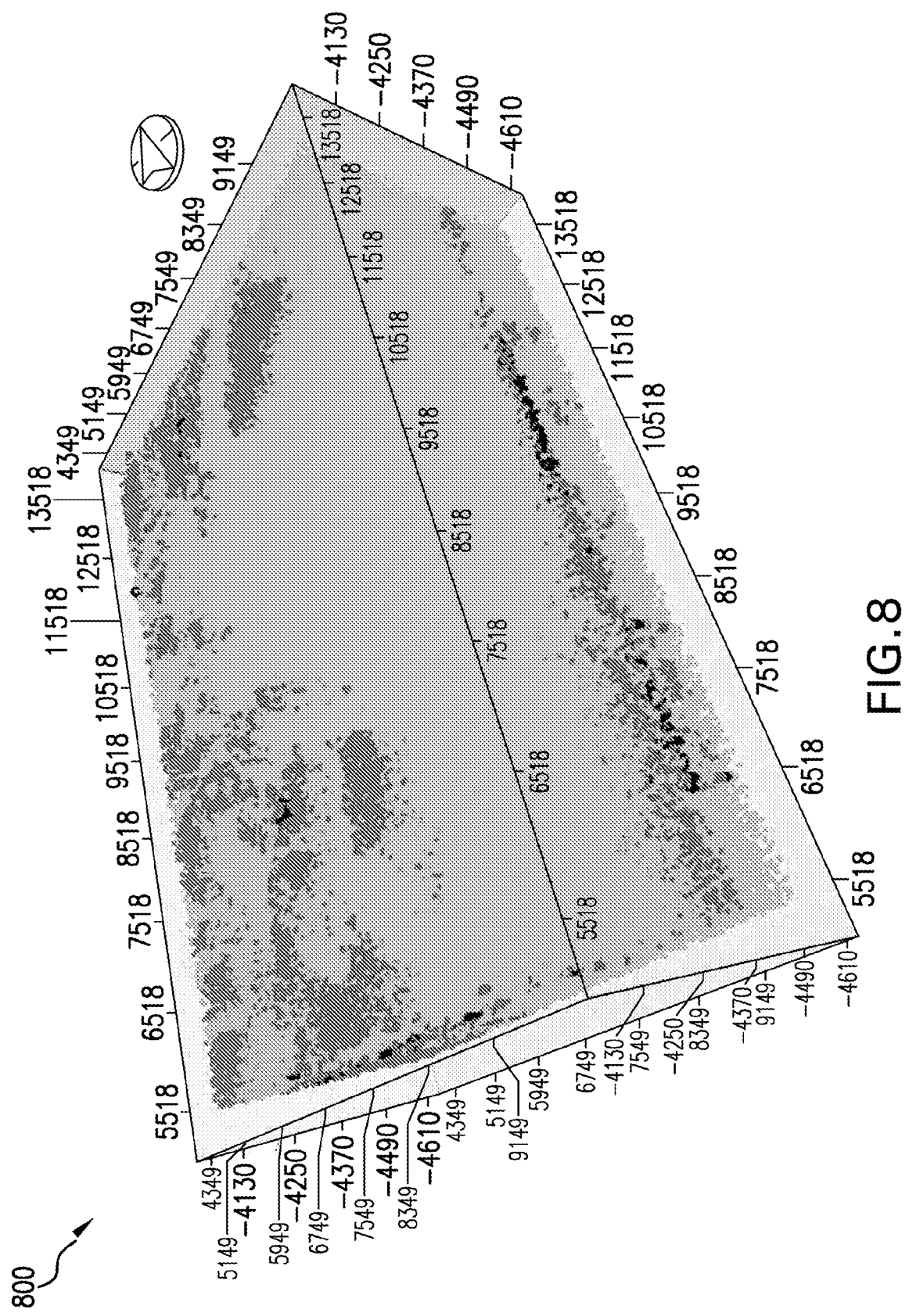
FIG. 8 illustrates a perspective view of an example point cloud representation of an output of a model for facies classification in accordance with some embodiments.

FIG. 8 illustrates a perspective view of an example point cloud representation 800 of an output of a model for facies classification (e.g., corresponding to the second DNN in FIG. 2A) in accordance with some embodiments. As illustrated, the example point cloud representation 800 is a graphical representation of a point-cloud with 500,000 points. The different colors in FIG. 8 correspond to different respective values for the facies type. Further, it is understood that the number of points in the point cloud is for purposes of illustration only, and developing a model with a significantly larger number of points may be possible in a distributed memory architecture implementation of the subject technology.

The embodiments described herein support computation in a distributed computing environment, which may include a distributed shared memory. In at least one embodiment, the DNN architecture described herein may be highly scalable and perform well in a system based on a distributed computing architecture.

Figure 9:
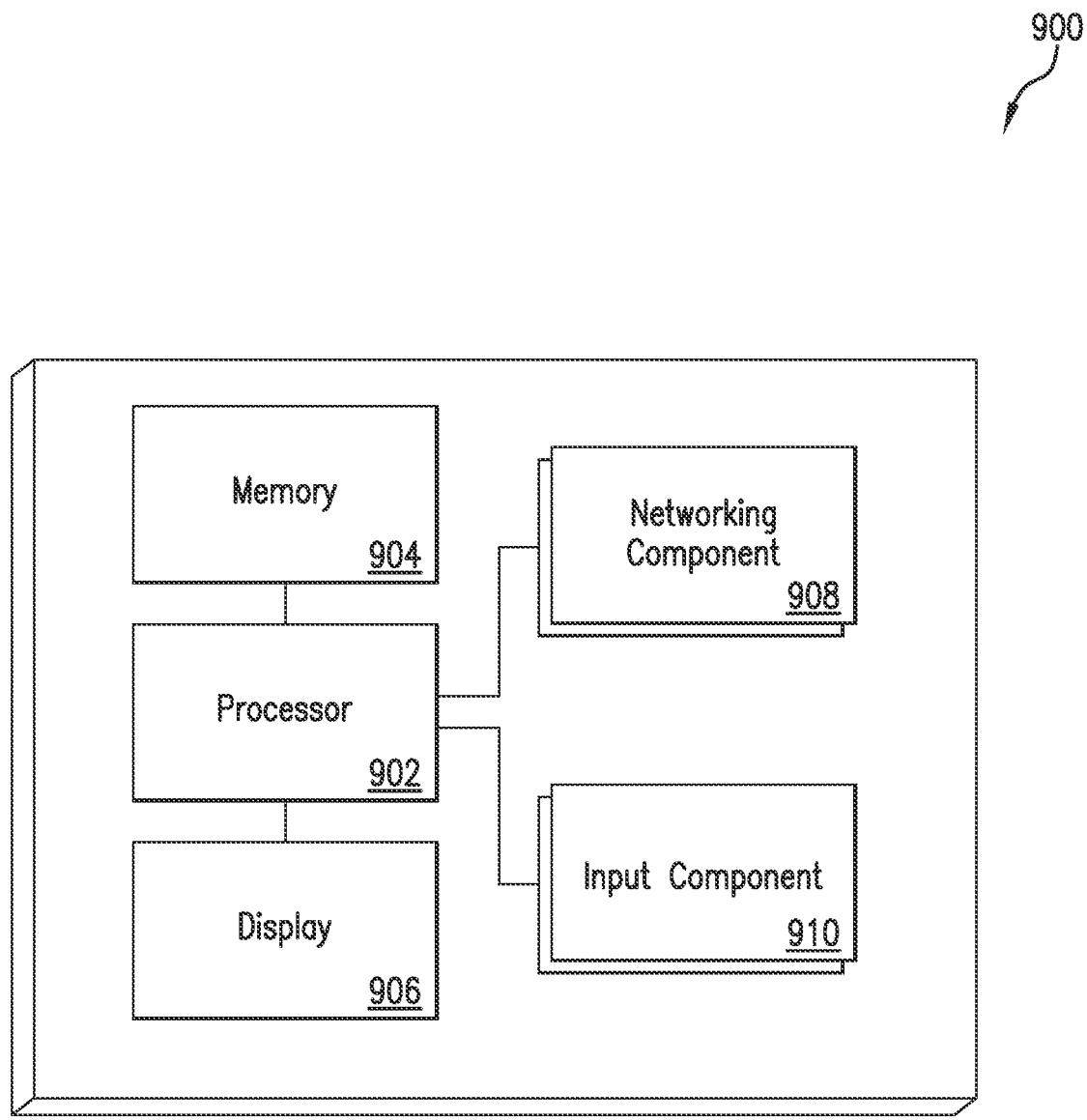
FIG. 9 illustrates a schematic diagram of a set of general components of an example computing device in accordance with some embodiments.

FIG. 9 illustrates a schematic diagram of a set of general components of an example computing device 900. In this example, the computing device 900 includes a processor 902 for executing instructions that can be stored in a memory device or element 904. The computing device 900 can include many types of memory, data storage, or non-transitory computer-readable storage media, such as a first data storage for program instructions for execution by the processor 902, a separate storage for images or data, a removable memory for sharing information with other devices, etc. The computing device 900 typically may include some type of display element 906, such as a touch screen or liquid crystal display (LCD). As discussed, the computing device 900 in many embodiments will include at least one input element 910 able to receive conventional input from a user. This conventional input can include, for example, a push button, touch pad, touch screen, wheel, joystick, keyboard, mouse, keypad, or any other such device or element whereby a user can input a command to the device. In some embodiments, however, such the computing device 900 might not include any buttons at all, and might be controlled only through a combination of visual and audio commands, such that a user can control the computing device 900 without having to be in contact with the computing device 900. In some embodiments, the computing device 900 of FIG. 9 can include one or more network interface elements 908 for communicating over various networks, such as a Wi-Fi, Bluetooth, RF, wired, or wireless communication systems. The computing device 900 in many embodiments can communicate with a network, such as the Internet, and may be able to communicate with other such computing devices.

Figure 10:
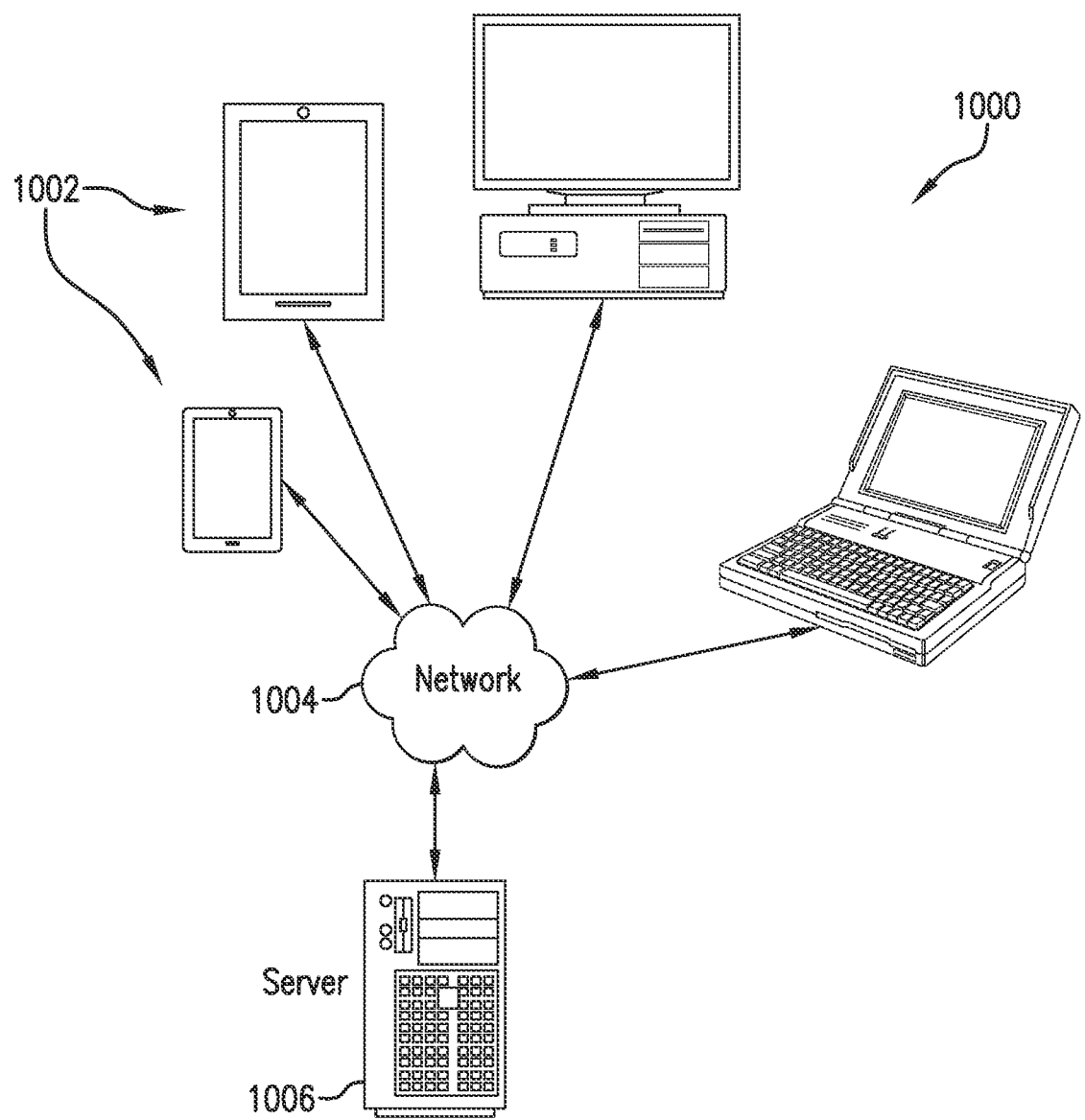
FIG. 10 illustrates a schematic diagram of an example of an environment for implementing aspects in accordance with some embodiments.

As discussed herein, different approaches can be implemented in various environments in accordance with the described embodiments. For example, FIG. 10 illustrates a schematic diagram of an example of an environment 1000 for implementing aspects in accordance with various embodiments. As will be appreciated, although a client-server based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like.

The network 1004 can include any appropriate network, including an intranet, the Internet, a cellular network, a local area network or any other such network or combination thereof. The network 1004 could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network 1004 can be enabled via wired or wireless connections and combinations thereof. In this example, the network includes the Internet, as the environment includes a server 1006 for receiving requests and serving content in response thereto, although for other networks, an alternative device serving a similar purpose could be used, as would be apparent to one of ordinary skill in the art. The server 1006 can store and provide the DNN models for predicting a petrophysical property and facies classification as described above. In an example, the server 1006 can run one or more applications including those written using TensorFlow and/or other machine learning software libraries for executing the DNN models. One or more of the client devices in FIG. 10 may communicate with the server 1006 in order to execute the DNN models to generate 3D static reservoir models in accordance to embodiments described herein.

The server 1006 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, and other devices capable of communicating via a network.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Various examples of aspects of the disclosure are described below as clauses for convenience. These are provided as examples, and do not limit the subject technology.

Clause 1. A method comprising: receiving input data comprising information associated with one or more well logs in a region of interest; determining, based at least in part on the input data, an input feature associated with a first deep neural network (DNN) for predicting a value of a property at a location within the region of interest; training, using the input data and based at least in part on the input feature, the first DNN; and predicting, using the first DNN, the value of the property at the location in the region of interest.

Clause 2. The method of Clause 1, further comprising: training a second DNN for classifying a type of facies at the location in the region of interest based at least in part on the predicted value of the property at the location in the region of interest.

Clause 3. The method of Clause 2, further comprising: predicting, using the first DNN, values of the property for a plurality of points of a point cloud, each of the plurality of points corresponding to a different location in the region of interest; and classifying, using the second DNN, types of facies for the plurality of points of the point cloud based at least in part on the predicted values of the property for the plurality of points of the point cloud.

Clause 4. The method of Clause 3, further comprising: generating, using the values of the property and the types of facies for the plurality of points of the point cloud, a second point cloud representing the region of interest.

Clause 5. The method of Clause 1, wherein determining, based at least in part on the input data, the input feature further comprises: determining a vertical variogram and a horizontal variogram of a property in each stratigraphic interval of the region of interest based at least in part on the input data; and determining, based at least in part on the vertical and horizontal variograms, the input feature for providing to the first DNN.

Clause 6. The method of Clause 5, further comprising: dividing, using the vertical variogram, the region of interest into a plurality of layers, wherein the input feature is based on a plurality of neighboring points selected from at least one layer from the plurality of layers.

Clause 7. The method of Clause 1, further comprising: generating a point cloud in the region of interest, the point cloud including a plurality of points corresponding to different locations in the region of interest.

Clause 8. The method of Clause 1, wherein the region of interest corresponds to a geologic volume, and the first DNN comprises a deep feedforward network.

Clause 9. The method of Clause 3, further comprising: mapping a set of coordinates corresponding to each point of the plurality of points in the region of interest, the set of coordinates being in a first coordinate system, to a second set of coordinates in a second coordinate system, wherein the first coordinate system comprises a Cartesian coordinate system and the second coordinate system comprises a UVW coordinate system.

Clause 10. The method of Clause 1, further comprising: generating, using the received input data, a training dataset, a validation dataset, and a test dataset, wherein the training dataset, the validation dataset, and the test dataset are mutually exclusive subsets of the received input data.

Clause 11. The method of Clause 1, wherein the property comprises at least one of a petrophysical property, a geochemical property, or a geomechanical property.

Clause 12. A system comprising: at least one processor; and a memory including instructions that, when executed by the at least one processor, cause the at least one processor to: receive input data comprising information associated with one or more well logs in a region of interest; determine, based at least in part on the input data, an input feature associated with a first deep neural network (DNN) for predicting a value of a petrophysical property at a location within the region of interest; predict, using the first DNN, values of the petrophysical property for a plurality of points of a point cloud, each of the plurality of points corresponding to a different location in the region of interest; and classify, using a second DNN, types of facies for the plurality of points of the point cloud based at least in part on the predicted values of the petrophysical properties for the plurality of points of the point cloud.

Clause 13. The system of Clause 12, wherein the instructions further cause the at least one processor to: generate, using the values of the petrophysical property and the types of facies for the plurality of points of the point cloud, a second point cloud representing the region of interest.

Clause 14. The system of Clause 12, wherein to determine, based at least in part on the input data, the input feature further comprises: determining a vertical variogram and a horizontal variogram of a petrophysical property in the region of interest based at least in part on the input data; and determining, based at least in part on the vertical and horizontal variograms, the input feature for providing to the first DNN.

Clause 15. The system of Clause 14, wherein the instructions further cause the at least one processor to: divide, using the vertical variogram, the region of interest into a plurality of layers, wherein the input feature is based on a plurality of neighboring points selected from at least one layer from the plurality of layers.

Clause 16. The system of Clause 12, wherein the instructions further cause the at least one processor to: generate a point cloud in the region of interest, the point cloud including a plurality of points corresponding to different locations in the region of interest.

Clause 17. The system of Clause 12, wherein the instructions further cause the at least one processor to: mapping a set of coordinates corresponding to each point of the plurality of points in the region of interest, the set of coordinates being in a first coordinate system, to a second set of coordinates in a second coordinate system, wherein the first coordinate system comprises a Cartesian coordinate system and the second coordinate system comprises a UVW coordinate system.

Clause 18. The system of Clause 12, wherein the instructions further cause the at least one processor to: generate, using the received input data, a training dataset, a validation dataset, and a test dataset, wherein the training dataset, the validation dataset, and the test dataset are mutually exclusive subsets of the received input data.

Clause 19. The system of Clause 12, wherein the petrophysical property comprises porosity, lithology, water saturation, permeability, density, oil/water ratio, geochemical information, paleo data, or water saturation.

Clause 20. A non-transitory computer-readable medium including instructions stored therein that, when executed by at least one computing device, cause the at least one computing device to: send input data to a server, the input data including information associated with one or more well logs in a region of interest, the region of interest corresponding to a geologic volume, wherein values of a petrophysical property for a plurality of points of a point cloud, each of the plurality of points corresponding to a different location in the region of interest, are determined using a first deep neural network (DNN), wherein, based at least in part on the values of the petrophysical property for the plurality of points of the point cloud, types of facies for the plurality of points of the point cloud are determined using a second DNN; receive, from the server, a second point cloud corresponding to the region of interest, the second point cloud including information for at least the petrophysical properties and facies classification of each point included in the second point cloud; and provide for display a 3D reservoir model based on the information from the second point cloud.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
   receiving input data comprising information associated with one or more well logs in a region of interest;
   generating, using the received input data, a training dataset, a validation dataset, and a test dataset, wherein the training dataset, the validation dataset, and the test dataset are mutually exclusive subsets of the received input data;
   determining, based at least in part on the input data, an input feature associated with a first deep neural network (DNN) for predicting a value of a property at a location within the region of interest;
   training, using the input data and based at least in part on the input feature, the first DNN; and
   predicting, using the first DNN, the value of the property at the location in the region of interest.

2. The method of claim 1, further comprising:
   training a second DNN for classifying a type of facies at the location in the region of interest based at least in part on the predicted value of the property at the location in the region of interest.

3. The method of claim 2, further comprising:
   predicting, using the first DNN, values of the property for a plurality of points of a point cloud, each of the plurality of points corresponding to a different location in the region of interest; and
   classifying, using the second DNN, types of facies for the plurality of points of the point cloud based at least in part on the predicted values of the property for the plurality of points of the point cloud.

4. The method of claim 3, further comprising:
   generating, using the values of the property and the types of facies for the plurality of points of the point cloud, a second point cloud representing the region of interest.

5. The method of claim 3, further comprising:
   mapping a set of coordinates corresponding to each point of the plurality of points in the region of interest, the set of coordinates being in a first coordinate system, to a second set of coordinates in a second coordinate system, wherein the first coordinate system comprises a Cartesian coordinate system and the second coordinate system comprises a UVW coordinate system.

6. The method of claim 1, wherein determining, based at least in part on the input data, the input feature further comprises:
   determining a vertical variogram and a horizontal variogram of a property in each stratigraphic interval of the region of interest based at least in part on the input data; and determining, based at least in part on the vertical and horizontal variograms, the input feature for providing to the first DNN.

7. The method of claim 6, further comprising:
dividing, using the vertical variogram, the region of interest into a plurality of layers, wherein the input feature is based on a plurality of neighboring points selected from at least one layer from the plurality of layers.

8. The method of claim 1, further comprising:
generating a point cloud in the region of interest, the point cloud including a plurality of points corresponding to different locations in the region of interest.

9. The method of claim 1, wherein the region of interest corresponds to a geologic volume, and the first DNN comprises a deep feedforward network.

10. The method of claim 1, wherein the property comprises at least one of a petrophysical property, a geochemical property, or a geomechanical property.

11. A system comprising:
at least one processor; and
a memory including instructions that, when executed by the at least one processor, cause the at least one processor to:
receive input data comprising information associated with one or more well logs in a region of interest;
generate, using the received input data, a training dataset, a validation dataset, and a test dataset, wherein the training dataset, the validation dataset, and the test dataset are mutually exclusive subsets of the received input data;
determine, based at least in part on the input data, an input feature associated with a first deep neural network (DNN) for predicting a value of a petrophysical property at a location within the region of interest;
predict, using the first DNN, values of the petrophysical property for a plurality of points of a point cloud, each of the plurality of points corresponding to a different location in the region of interest; and
classify, using a second DNN, types of facies for the plurality of points of the point cloud based at least in part on the predicted values of the petrophysical properties for the plurality of points of the point cloud.

12. The system of claim 11, wherein the instructions further cause the at least one processor to:
generate, using the values of the petrophysical property and the types of facies for the plurality of points of the point cloud, a second point cloud representing the region of interest.

13. The system of claim 11, wherein to determine, based at least in part on the input data, the input feature further comprises:
determining a vertical variogram and a horizontal variogram of a petrophysical property in the region of interest based at least in part on the input data; and
determining, based at least in part on the vertical and horizontal variograms, the input feature for providing to the first DNN.

14. The system of claim 13, wherein the instructions further cause the at least one processor to:
divide, using the vertical variogram, the region of interest into a plurality of layers, wherein the input feature is based on a plurality of neighboring points selected from at least one layer from the plurality of layers.

15. The system of claim 11, wherein the instructions further cause the at least one processor to:
generate a point cloud in the region of interest, the point cloud including a plurality of points corresponding to different locations in the region of interest.

16. The system of claim 11, wherein the instructions further cause the at least one processor to:
mapping a set of coordinates corresponding to each point of the plurality of points in the region of interest, the set of coordinates being in a first coordinate system, to a second set of coordinates in a second coordinate system, wherein the first coordinate system comprises a Cartesian coordinate system and the second coordinate system comprises a UVW coordinate system.

17. The system of claim 11, wherein the petrophysical property comprises porosity, lithology, water saturation, permeability, density, oil/water ratio, geochemical information, paleo data, or water saturation.

18. A non-transitory computer-readable medium including instructions stored therein that, when executed by at least one computing device, cause the at least one computing device to:
send input data to a server, the input data including information associated with one or more well logs in a region of interest, the region of interest corresponding to a geologic volume,
wherein the input data is used to generate a training dataset, a validation dataset, and a test dataset,
wherein the training dataset, the validation dataset, and the test dataset are mutually exclusive subsets of the input data,
wherein values of a petrophysical property for a plurality of points of a point cloud, each of the plurality of points corresponding to a different location in the region of interest, are determined using a first deep neural network (DNN),
wherein, based at least in part on the values of the petrophysical property for the plurality of points of the point cloud, types of facies for the plurality of points of the point cloud are determined using a second DNN;
receive, from the server, a second point cloud corresponding to the region of interest, the second point cloud including information for at least the petrophysical properties and facies classification of each point included in the second point cloud; and
provide for display a 3D reservoir model based on the information from the second point cloud.

* * * * *